United States Patent [19]

Grunberg et al.

[11] Patent Number: 4,750,596
[45] Date of Patent: Jun. 14, 1988

[54] CONTROL MECHANISM FOR A COUPLING DEVICE SUCH AS A CLUTCH, VARIABLE SPEED DRIVE, BRAKE OR THE LIKE

[75] Inventors: Pierre Grunberg, Paris; Roger Texier, La Courneuve, both of France

[73] Assignee: Valeo, Paris, France

[21] Appl. No.: 912,761

[22] Filed: Sep. 29, 1986

[30] Foreign Application Priority Data

Oct. 11, 1985 [FR] France ............................ 85 15069

[51] Int. Cl.$^4$ .................... F16D 23/12; F16D 49/16
[52] U.S. Cl. ........................................ 192/7; 74/531; 188/83; 192/90
[58] Field of Search ............... 192/2, 7, 8 R; 74/531; 188/83; 310/77

[56] References Cited

U.S. PATENT DOCUMENTS

| | | | |
|---|---|---|---|
| 2,249,297 | 7/1941 | Muffett | 188/83 X |
| 2,465,601 | 3/1949 | Ochtman | 192/2 X |
| 2,538,629 | 1/1951 | Raffke | 188/83 X |
| 2,571,848 | 10/1951 | Ehlers | 192/67 |
| 2,639,199 | 5/1953 | Patrosio | 188/83 X |
| 2,746,583 | 5/1956 | Blevins | 192/2 |
| 2,941,133 | 6/1960 | Springer | 318/11 |
| 3,227,976 | 1/1966 | Barlow et al. | 74/531 X |
| 3,873,066 | 3/1975 | Opyrchal | 188/83 X |
| 3,902,575 | 9/1975 | Nelson et al. | 188/83 X |
| 3,964,337 | 6/1976 | Pardington | 74/531 X |
| 4,440,035 | 4/1984 | Foulk | 74/89.15 |
| 4,645,137 | 2/1987 | Young | 188/83 X |

FOREIGN PATENT DOCUMENTS

| | | |
|---|---|---|
| 548275 | 6/1956 | Belgium . |
| 213524 | 9/1909 | Fed. Rep. of Germany . |
| 2523743 | 9/1983 | France . |
| 2541793 | 8/1984 | France . |
| 2117076 | 10/1983 | United Kingdom . |

*Primary Examiner*—Rodney H. Bonck
*Attorney, Agent, or Firm*—Young & Thompson

[57] ABSTRACT

A control mechanism for a coupling device such as a clutch or variable speed drive or brake comprises an electric motor. A mechanism links the electric motor to an actuator device for the coupling device. A brake device is coupled to this linking mechanism. The brake device is also coupled to the drive shaft and comprises two friction pads at diametrally opposed positions relative to the drive shaft in contact with the drive shaft. A spring urges the pads towards the drive shaft substantially radially. The brake device comprises a casing rotationally immobilized relative to the drive shaft, which passed through the casing, which encloses the two friction pads. The casing has a back wall and one of the pads is disposed between the drive shaft and this wall. The other pad is slidably disposed in the casing and pressed against the drive shaft by the spring, which is prestressed in compression. The casing is movable relative to the drive shaft in a substantially radial direction, which enables self-centering of the brake device relative to the drive shaft. The friction pad between the back wall and the drive shaft is molded in one piece with the casing. The casing comprises another back wall which has a threaded section screwed into the casing to form a movable abutment member for varying the prestressing of the spring.

7 Claims, 2 Drawing Sheets

CONTROL MECHANISM FOR A COUPLING DEVICE SUCH AS A CLUTCH, VARIABLE SPEED DRIVE, BRAKE OR THE LIKE

BACKGROUND OF THE INVENTION

1. Field of the Invention

The invention concerns a control mechanism for a coupling device such as, for example, a clutch, a variable speed drive or a brake, and is particularly concerned with a motorized mechanism of this kind in which a linking mechanism generally comprising gearing and a toothed sector is disposed between the motor and means for actuating the coupling device, comprising a level mounted to pivot about a shaft, for example.

The invention is more particularly directed to an improvement made to this type of device in order to improve its "irreversibility", that is to say the ability to control with precision the displacement of the actuator lever, whatever the actuation direction, avoiding in particular any "backlash" of the motor after each period of actuation as a result of reaction forces transmitted to the linking mechanism by the coupling device itself.

2. Description of the Prior Art

British patent application No. 2 117 076 describes several embodiments of a motorized control mechanism of this kind suitable for actuating a coupling device of the type defined hereinabove. Specifically, a system, of this kind has been developed for the motorized control of an automobile vehicle clutch in order to eliminate the traditional clutch pedal, but it may equally well serve to control a variable speed drive (especially of the belt type with variable geometry pulleys) or even a brake.

In one embodiment described in the above-mentioned document the drive shaft of the motor comprises a portion forming a lead screw meshing with a gear itself interlocking with a toothed sector attached to an actuator lever. This is fastened to a forked lever which, on pivoting, cooperates with an abutment member (a clutch release bearing, for example) movable along an axis and adapted to actuate a diaphragm-shaped coupling spring. An elastic device for moderating the operating force is associated with the toothed sector and/or the gear to reduce the force required of the electric motor over the coupling or decoupling travel, which makes it possible to employ an electric motor of relatively low power, comparable with that of an automobile windshield wiper motor in the case of a standard clutch, for example.

In one particularly advantageous embodiment, the elastic force moderator device is a simple spring coupled to a special gearwheel of said gearing.

This type of device can function satisfactorily provided that "irreversible" transmission between the motor and the coupling device is achieved. Such "irreversibility" may be provided at the level of the mechanical coupling between the lead screw and the gearing, by choosing the inclination of the threads appropriately. The problem becomes particularly severe, however, when the motor is fed a series of electrical pulses, where each pulse is intended to produce a predetermined displacement of the movable abutment member. If the "irreversibility" of the mechanism is less than perfect, backlash is observed in the gearing system after each pulse, caused by the reaction of the coupling device itself. The cumulative effect of such backlash may very seriously compromise the precision with which the movable abutment member is positioned, as a consequence of which control becomes unreliable or even impossible. It has also been found that the "irreversibility" achieved at the level of the lead screw and the gearing is difficult to reproduce in an industrial context, given a deliberately limited motive power. An object of the invention is to resolve this problem.

SUMMARY OF THE INVENTION

The present invention consists in a control mechanism for a coupling device comprising an electric motor, a drive shaft of the electric motor, an actuator device for the coupling device, a mechanism linking together the electric motor and the actuator device and a brake device coupled to the linking mechanism.

The brake device is preferably applied to the drive shaft of the motor itself, that is to say it exerts its braking actions on a portion of this, in the vicinity of the lead screw. Also, the brake device may be "floating" to enable it to be self-centering relative to the motor shaft.

The invention will be better understood and other advantages of the invention will emerge more clearly from the following description of a system in accordance with the invention given by way of example only and with reference to the appended drawings.

DESCRIPTION OF THE PREFERRED EMBODIMENT

Figure 1:
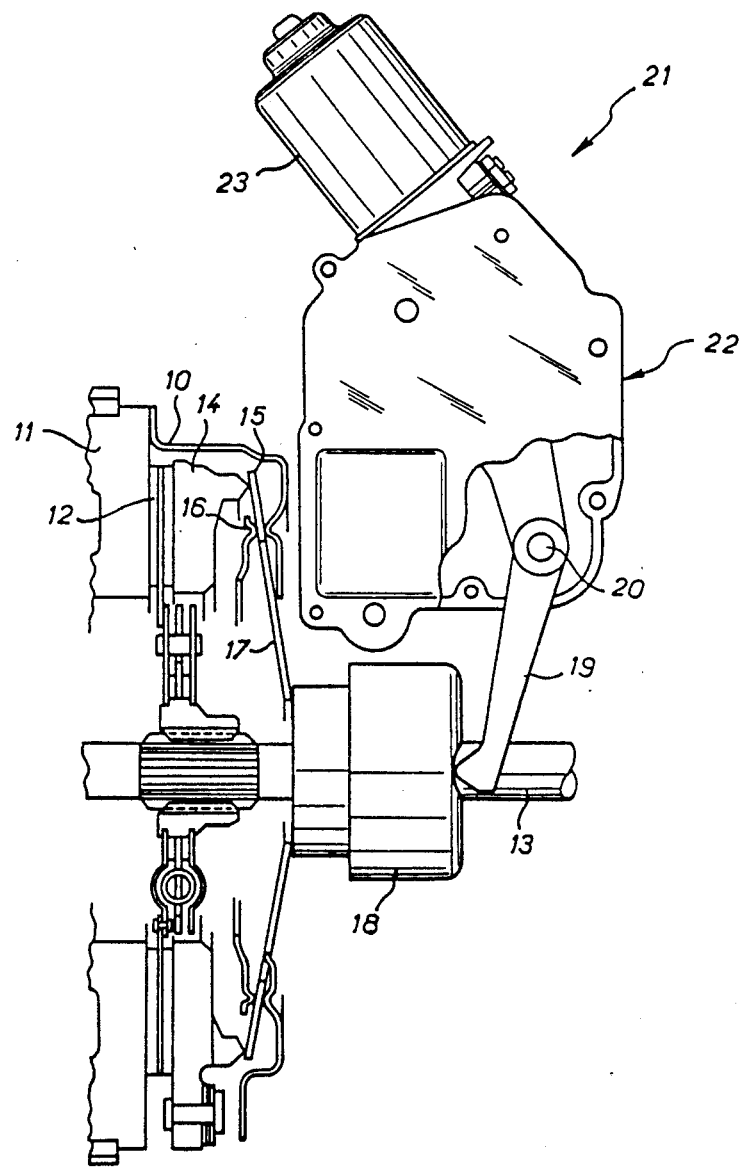
FIG. 1 is a schematic representation of a system comprising a clutch and a control mechanism for it in accordance with the invention.

The embodiment shown in the drawing concerns one application of the invention to a clutch controlled by a diaphragm-shaped spring, in particular for automobile vehicles.

The clutch shown in FIG. 1 comprises a cover 10 adapted to be fixed to the flywheel 11 of the motor of the automobile vehicle. The flywheel 11 constitutes a reaction plate. The clutch also comprises a friction disk 12 which is coupled to the primary shaft 13 of the gearbox of the automobile vehicle. The disk 12 is adapted to be clamped between the reactions plate 11 and a pressure plate 14 as the result of an elastic clamping force applied by a diaphragm-shaped spring 15. The diaphragm 15 bears on a circular projection 16 on the cover 10 and has in its central region fingers 17 adapted to be pushed towards the left as seen in FIG. 1 by a clutch release device 18 when it is required to change the clutch from its engaged state as shown in FIG. 1 to a disengaged state in which the release bearing 18, by pushing on the diaphragm 15, cancels the clamping action on the pressure plate 14, which releases the friction disk 12.

The release bearing 18 carried by the shaft 13 is pushed by a forked lever 19 fastened to a shaft 20 which extends transversly relative to the shaft 13. The combination of the shaft 20 and the lever 19 constitutes the actuator device of the clutch since it moves the release bearing 18 to alter the engaged or disengaged state of the clutch.

Figure 2:
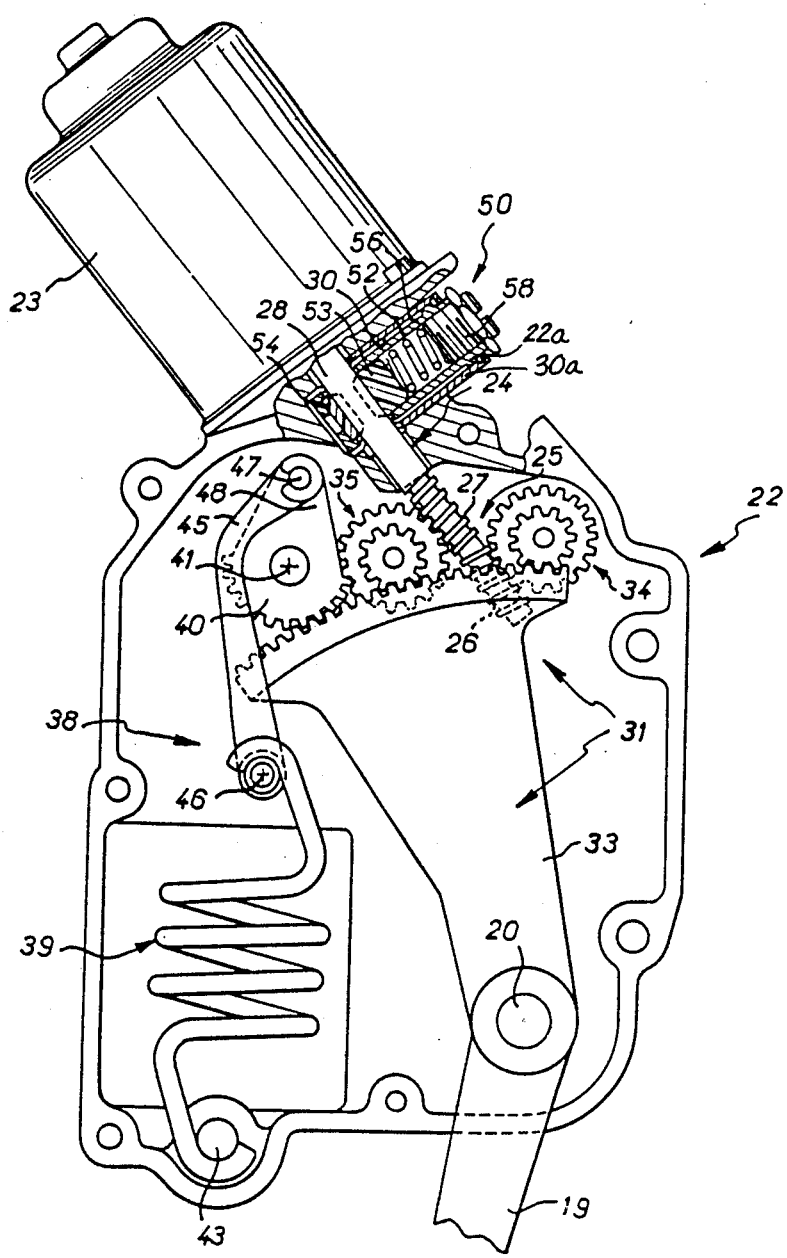
FIG. 2 shows the control mechanism alone and to a larger scale.

The mechanism 21 controlling the shaft 20 and the lever 19 is motorized. To be more precise, it comprises a relatively flat casing 22 and an electric motor 23 fixed to the outside of the casing. The drive shaft 24 of the motor 23 enters the casing 22 and ends in a threaded portion 25 comprising two sections 26 and 27 with threads in opposite directions. A smooth part 28 of the shaft 24 situated between the motor 23 and the threaded portion 25 passes through a cavity 30 in the casing which is open towards the outside and which will be described later. Cavity 30 is lined with a sleeve 30a which, as can be seen in FIG. 2, is coaxial with casing 22. Casing 22 has an external projection 22a that bears against an inner surface of sleeve 30a. The casing 22 also accommodates a linking mechanism 31 disposed between the motor 23 and the aforementioned actuator device. This linking mechanism comprises a toothed sector 33 attached to the shaft 20 and pivoting relative to this axis and two gears 34, 35 each comprising two toothed wheels disposed coaxially side by side. For each gear one of the toothed wheels meshes with the toothed sector 33 and the other with one of the threaded sections 26 or 27. The two gears turn about parallel axes situated one on each side of the threaded portion 25. This arrangement, which is known per se, has the advantage of absorbing axial reaction forces on the threaded portion and the motor shaft. Also, the linking mechanism comprises an elastic device 38 for moderating the operating force, comprising a helical spring 39 linked to a gear 40 mounted to rotate about a shaft 41 fixed to the casing and meshing with the toothed sector 33. The spring 39, which is operative in traction, has one end attached to the casing by means of an anchor pin 43 situated near the shaft 20. The other end of the spring is coupled to a cranked arm 45 consisting of two identical flat parts held at a distance from each other by two pins 46, 47. The arm is coupled to the spring 39 by the pin 46 and to the gear 40 by the pin 47 fixed to the latter at a point spaced from the shaft 41. To be more precise, the gear 40 is formed with a toothed circular portion and a radial extension 48 carrying the pin 47 and extending away from the pin 46 relative to the shaft 41. By virtue of this design, the double arm is articulated in the vicinity of the gear 40 and the toothed sector 33, without impeding their movements, as clearly emerges from the drawings.

The force moderating system 38 assists the electric motor 23 during the engaging and releasing of the clutch. In the clutch engaged position, the position shown in the drawings, the pivot points consisting of the pins 46, 47 and the shafts 41, 43 are aligned. Thus the toothed sector 33 does not exert any significant force on the abutment member and the clutch is held engaged by the diaphragm with its full elastic force.

To release the clutch a series of electrical pulses is applied to the electric motor 23, the polarity corresponding to the sense of actuation required. The toothed sector 33, the shaft 20, the lever 19 and the abutment member 18 overcome the elastic resisting force of the diaphragm 50 and release the clutch by releasing the disk 12. During this disengagement of the clutch the force moderating spring 39 is advantageously operative with a law analogous to that governing the action of the diaphragm 15 itself, which makes it possible to use a reduced force.

To engage the clutch the operation is just as simple, but in the reverse sense. Once again, the electric motor 23 need only develop a low force.

In the example shown the toothed sector is fastened to the shaft 20 and drives it directly in rotation. It is entirely possible, however, to associate with the toothed sector 33 a system for compensating wear of the clutch facing, inserted between the pivot point of the toothed sector 33 and the shaft 20.

In accordance with the invention the control mechanism further comprises a brake device 50 coupled to the linking mechanism. The brake device operates directly on the drive shaft 24 of the electric motor 23, actually on the smooth portion 28 previously mentioned. It comprises two friction pads 53, 54 in diametrially opposed positions relative to the shaft in contact with a cylindrical portion of the shaft 24 and urged towards it, in a substantially radial direction relative to the shaft, by a spring 52. It will be seen from FIG. 2 that the friction pads 53, 54 have a substantial dimension parallel to the axis of shaft 24 and extend over a substantial sector of the cylindrical portion of shaft 24. The pads and the spring are accommodated in a cylindrical housing 56 comprising two diametrally opposed openings for the shaft 24 to pass through. The housing 56 is rotationally immobilized relative to the shaft as it is housed within the cavity 30. The housing is also able to move in a radial direction relative to the shaft 24, to enable self-centering of the brake device relative to the shaft. The brake pad 53 is mounted to slide in the housing 56 and it is pressed against the drive shaft by the spring 52 which is prestressed in compression, whereas the brake pad 54 is situated between a back wall of the casing 56, parallel to the shaft 24, and the shaft 24 itself. The pads 53 and 54 are of a relatively rigid plastic material. As a consequence of this, if the casing 56 is itself made from a plastics material the pad 54 may be molded in one part with the casing. The other back wall of this casing consists of a threaded section 58 screwed into a threaded opening in the casing. The threaded section thus forms a movable abutment member for varying the prestressing of the spring 52.

The brake device which has been described renders the system "irreversible" in all cirsumstances by adding a braking component more reliable than that which is developed between the threaded portion 25 and the gears 34 and 35, this braking component possibly being adjustable.

There is claimed:

1. A control mechanism for a coupling device, said control mechanism comprising an electric motor having a drive shaft, an actuator device for said coupling device, a mechanism linking together said electric motor and said actuator device, a brake device constantly applying braking force to said drive shaft, said brake device comprising first and second friction pads disposed on opposite sides of said drive shaft, said first and second friction pads being received in a casing held against rotational movement of said drive shaft and radially oriented relative to said drive shaft, said first friction pad being provided at one end of said casing for friction bearing engagement with said drive shaft and said second friction pad being disposed on the opposite side of said drive shaft from said first friction pad for friction bearing engagement with said drive shaft, and a spring disposed between said second friction pad and the end of said casing opposite said one end for urging each of said first and second friction pads in friction bearing engagement with said drive shaft.

2. A control mechanism according to claim 1, where said casing is floatingly mounted for radial movement relative to said drive shaft, to enable said brake device to self-center itself relative to said drive shaft.

3. A control mechanism according to claim 2, wherein said other end of said casing is threaded, and a threaded member in threaded engagement with said other end and acting against said spring for varying the preload of said spring.

4. A control mechanism according to claim 1, wherein said casing is mounted in a sleeve substantially coaxial therewith.

5. A control mechanism according to claim 4, wherein said casing has an external projection cooperable with the inner surface of said sleeve.

6. A control mechanism according to claim 1, wherein the portion of said drive shaft cooperable with said friction pads is cylindrical.

7. A control mechanism according to claim 6, wherein said friction pads have a substantial dimension parallel to the axis of the drive shaft and extend over a substantial sector of said cylindrical portion of said drive shaft.

* * * * *